No. 818,404. PATENTED APR. 24, 1906.
J. & J. C. BAHL.
MUSIC LEAF TURNING STAND.
APPLICATION FILED MAR. 24, 1905.

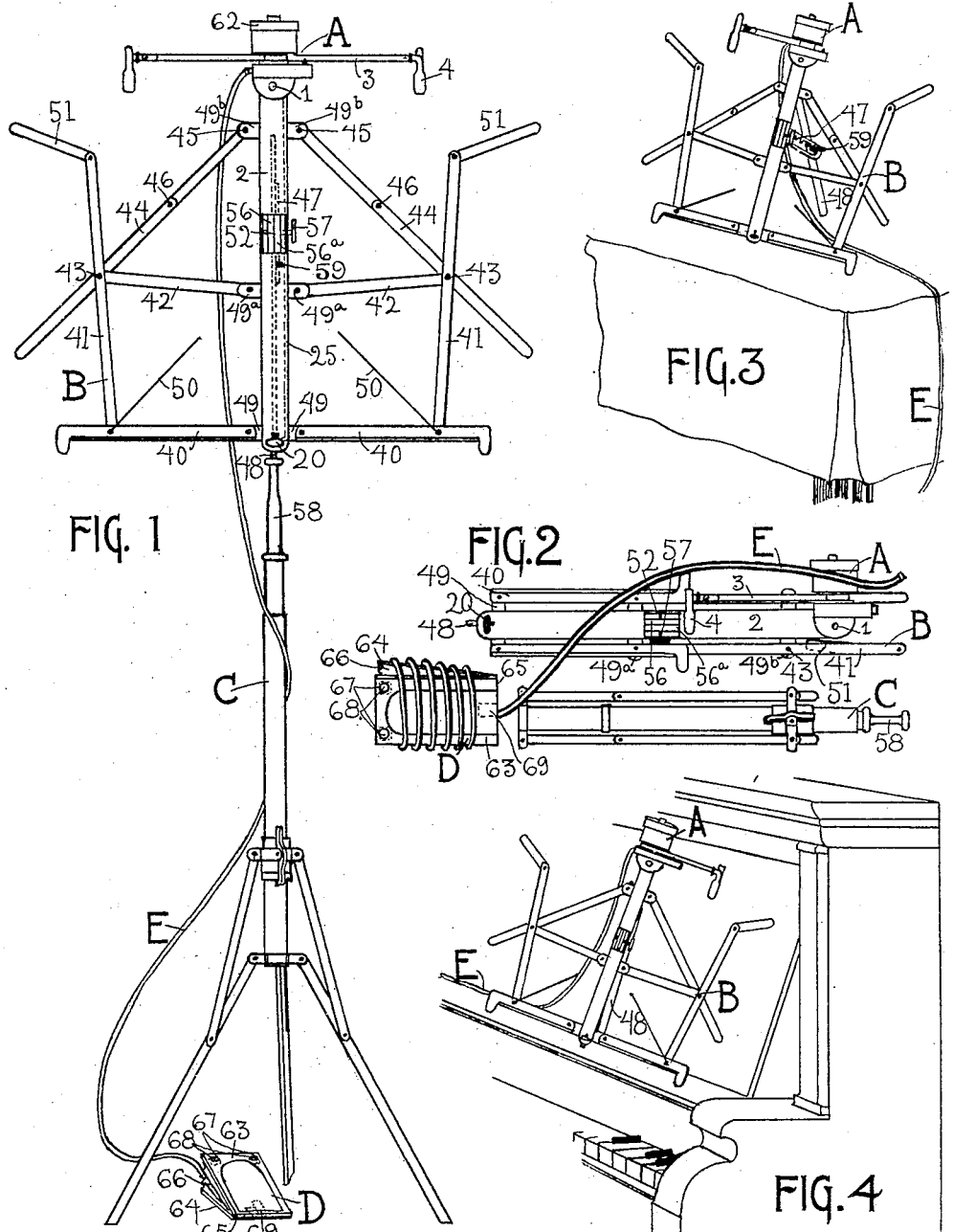

4 SHEETS—SHEET 2.

Witnesses:
Aug. M. Petersen
Eugene Burnitz

Inventors:
Joseph Bahl
Joseph Christian Bahl

No. 818,404. PATENTED APR. 24, 1906.
J. & J. C. BAHL.
MUSIC LEAF TURNING STAND.
APPLICATION FILED MAR. 24, 1905.
4 SHEETS—SHEET 3.
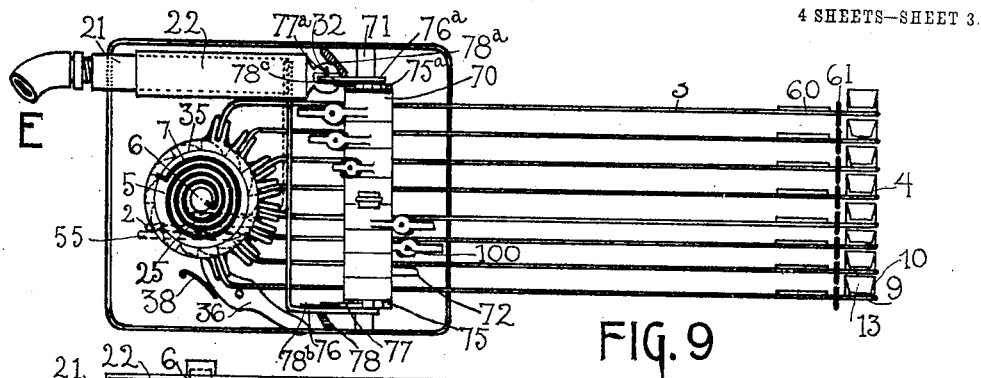
FIG. 9
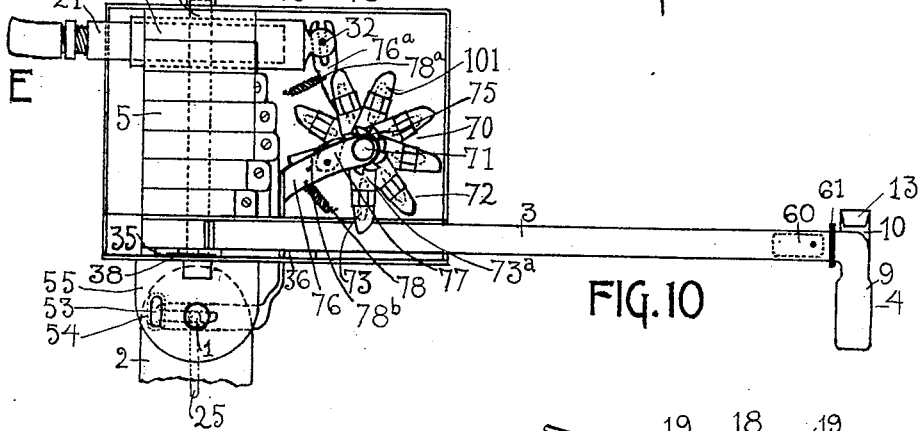
FIG. 10
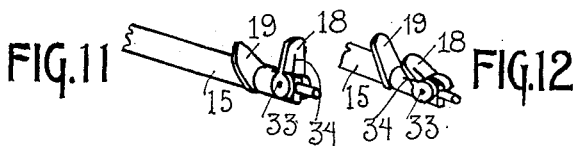
FIG. 11  FIG. 12
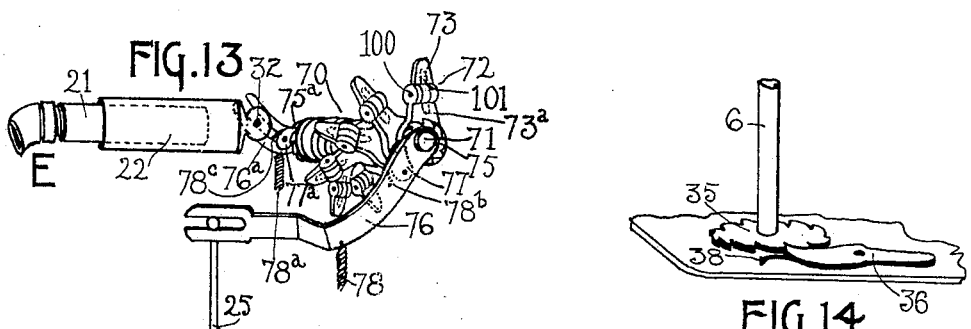
FIG. 13
FIG. 14
Witnesses:
Aug. M. Petersen
Eugene Burnitz
Inventors:
Joseph Bahl
Joseph Christian Bahl

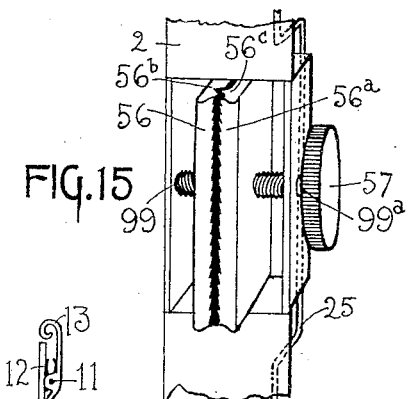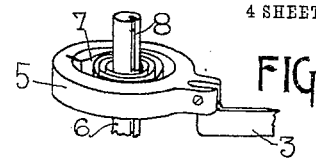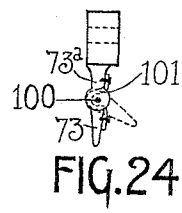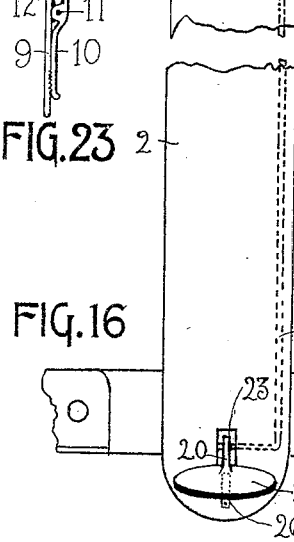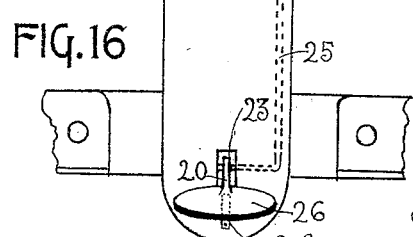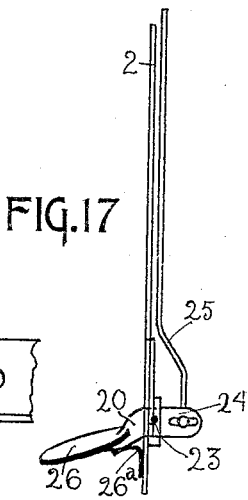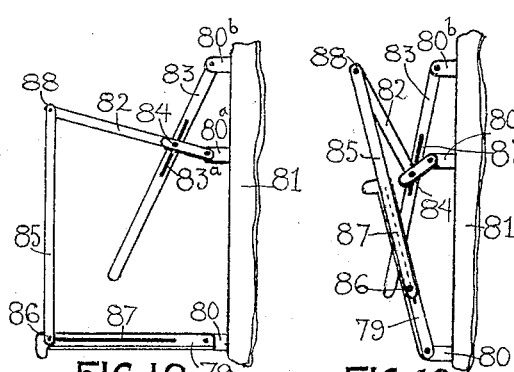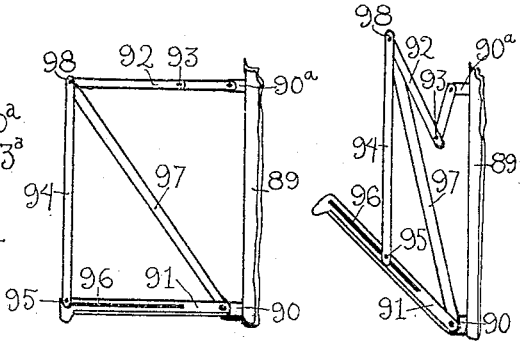

UNITED STATES PATENT OFFICE.

JOSEPH BAHL AND JOSEPH CHRISTIAN BAHL, OF CHICAGO, ILLINOIS.

MUSIC-LEAF-TURNING STAND.

No. 818,404.        Specification of Letters Patent.        Patented April 24, 1906.

Application filed March 24, 1905. Serial No. 251,890.

*To all whom it may concern:*

Be it known that we, JOSEPH BAHL and JOSEPH CHRISTIAN BAHL, citizens of the United States, and residents of Chicago, in the county of Cook and State of Illinois, have invented a Music-Leaf-Turning Stand, of which the following, taken in connection with the accompanying drawings, is a specification.

Our invention is an apparatus for automatically turning the leaves of music, the music-leaf-turning mechanism being mounted on a music-stand. Without a tripod portion it is to be used as a music-leaf-turning rack on tables, pianos, organs, and any ordinary surface.

The leaves of music are to be turned over by means of spring-actuated metal arms, all of which are pivoted on a single axle. Said arms are successively released by means of an escapement which is operated by means of a finger-lever or a pneumatic releasing device, whichever is the most convenient to the player, this music-leaf-turning stand being provided with both means and is carried out as follows, reference being had to the accompanying drawings, wherein—

Figure 5:
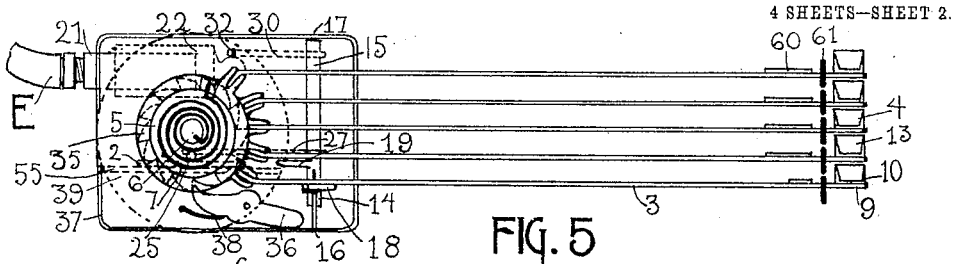
Figure 6:
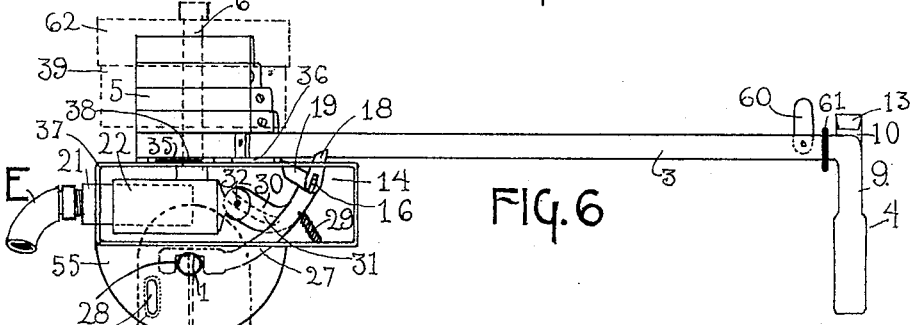
Figure 7:
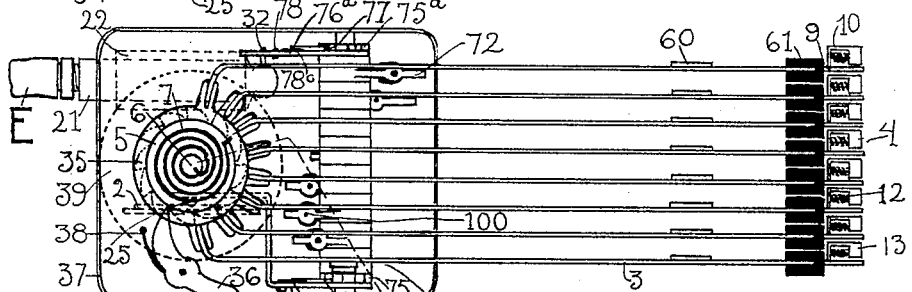
Figure 8:
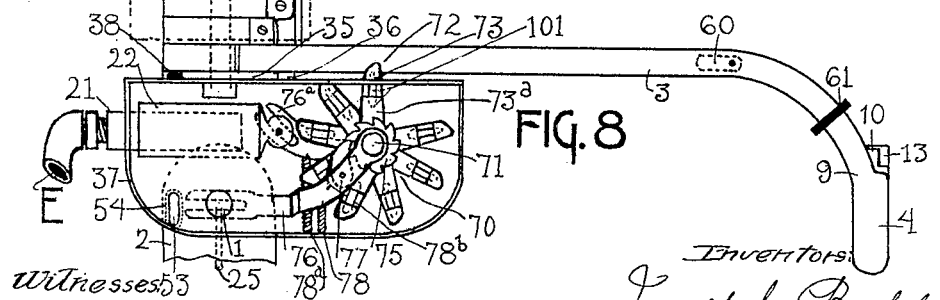

Figure 1 is a front view of the music-leaf-turning stand complete ready for operation. Fig. 2 is the same folded. Fig. 3 is the music-leaf-turning stand without its tripod portion shown on a table, a pivoted leg acting as a support and the flexible tube partly shown. Fig. 4 is the same shown on a piano, the flexible tube partly shown. Fig. 5 is a top view of the music-leaf-turning mechanism. Fig. 6 is a front view of the same. Fig. 7 is the top view of an equivalent music-leaf-turning mechanism. Fig. 8 is a front view of the same. Fig. 9 is a top view of another equivalent music-leaf-turning mechanism. Fig. 10 is a front view of the same. Fig. 11 is a front perspective view of a part of the escapement, showing the hinged tooth in normal position. Fig. 12 is the same showing the hinged tooth bent to the rear. Fig. 13 is a front perspective view of an equivalent escapement. Fig. 14 is a front perspective view of the ratchet-wheel and pawl by means of which the tension of the coiled springs within the cups is regulated. Fig. 15 is the front perspective view of the vise. Fig. 16 is a front view of the finger-lever. Fig. 17 is a side view of the same. Fig. 18 is the left side of an equivalent to the desk portion of the music-leaf-turning stand. Fig. 19 is the same partially folded. Fig. 20 is the left side of another equivalent to the desk portion of the music-leaf-turning stand. Fig. 21 is the same partially folded. Fig. 22 is a front perspective view of a circular cup and the spring it contains. Fig. 23 is a side view of a clasp. Fig. 24 is the side view of a tooth of the equivalent escapement, Fig. 13.

Similar letters and numerals refer to similar parts wherever they occur in the different parts of the drawings.

The complete music-leaf-turning stand consists of the music-leaf-turning mechanism A, the desk portion B, the tripod portion C, and the bellows D, with the flexible tube E. The music-leaf-turning mechanism A is pivotally secured at 1 to the upper end of the central bar 2 of the desk portion B and consists of a plurality of metal music-leaf-turning arms 3, the outer ends of which terminate in the spring-pressed clasps 4, and their inner ends are secured to the circular cups 5, each arm being secured to a cup. All of said cups 5 are pivoted on the axle 6. Inside of these cups are the coiled springs 7, which throw the arms 3 a half-revolution from the right to the left, one spring being in each cup. One end of said springs is fastened to a vertical groove 8 on the axle 6, and the other end is secured to the inner walls of their respective cups. The leaves of music are secured to the leaf-turning arms 3 by means of the clasps 4, consisting of two jaws 9 and 10. The jaw 9 is a continuation of the arm, and the jaw 10 is pivoted to the jaw 9 on the pin 11. Said pin 11 supports the spring 12, which presses the two jaws together at their lower ends. The jaw 10 is provided with a loop 13 at its upper end, which extends a little higher than the jaw 9. When the jaw 9 of the first arm and the jaw 10 of the last arm are pressed together by the player, the jaws 10 of all the clasps come in contact at their looped ends 13 and cause all clasps to simultaneously open. In this way the leaves of music are simultaneously released from the clasps when through with them. The jaws 9 and 10 have their inner surfaces roughened by cross-lines. This prevents the leaves of music slipping out. The arms 3 are held on the right side of the desk portion B against the tension of the springs 7 by the escapement 14, Fig. 5. Said escapement successively releases said arms and consists of a shaft 15, pivoted at 16 and 17 on the walls of the metal casing 37. Said shaft has two teeth 18 and 19 situated on the front end thereof. The tooth 19 is situated a short distance to the rear of the tooth 18, said teeth projecting from said shaft, so that in normal position the tooth 18 projects in the path of the leaf-turning arms 3 and the tooth 19 projects just outside of the path of said arms 3. When the shaft 15 is partially revolved, the tooth 18 is removed from the path of the first arm, releasing same. The tooth 19 with the same movement comes in front of the second arm before the first arm is released, thus holding all of the following arms in check. As the shaft 15 revolves back to its normal position, caused by the spring 29, the tooth 19 is removed from in front of the second arm, while the same movement causes the tooth 18 to come in front of the second arm and prevents the second arm from turning until the player desires to turn over the leaf of music secured thereto. This partially revolving of the escapement 14 and successively releasing the arms is brought about by means of a finger-lever 20 or the pneumatic releasing device consisting of the bellows D, the flexible tube E, the metal tube 21, and the metal cap 22, which fits over the metal tube 21. The flexible tube E is detachable from the bellows D and from the metal tube 21. The finger-lever 20 is situated on the lower end of the central bar 2 of the desk portion B. Said finger-lever is pivoted on the pin 23, Fig. 17, the rear end 24 making connection with the rod 25, and the front end 26 is the part upon which the player presses to release an arm. A spring 26ª is tensioned whenever the part 26 is depressed and causes said part to regain its normal position when the pressure thereon is released. The rod 25 connects the finger-lever 20 to the spring-retracted lever 27, which is fastened to the shaft 15 by its one end, and the other notched end is engaged by the rod 25 at 28. The player pressing on the part 26 of the finger-lever 20, the part 24 is raised. This motion being imparted to the rod 25 causes a partial revolution of the escapement 14, thus releasing an arm in the manner above described. The escapement regains its normal position when the pressure on the finger-lever 20 is released by means of the spring 29, it being tensioned whenever the lever 27 is raised. The player's hands being both occupied, the arms 3 are released by means of the pneumatic releasing device D E 21 22. The cap 22 is connected with the escapement 14 by the lever 30, which is fastened to the shaft 15 by its one end, and the slit 31 makes the operative connection with the cap 22 on the other end. Said cap 22 fits over the metal tube 21, and when air is forced therein from without a motion is imparted to the cap 22, and the stud 32, passing along the slit, causes the escapement 14 to partially revolve, with the same results as by means of the finger-lever 20, described above. The air-pressure is provided by means of a bellows of ordinary construction D, which is placed on the floor and operated by the player's foot. The flexible tube E, of rubber or other suitable material, connects the bellows D with the tube 21. It being flexible permits the player to adjust the tripod portion C to any height.

While we have shown the pneumatic releasing device in the form above described, it is obvious that any other equivalent device depending on air-pressure can be substituted.

The tooth 18, Fig. 11, is of hinge construction, it being pivoted on the pin 33. A spring 34 normally keeps said tooth in upright position. When the pressure occasioned by returning the arms 3 to the escapement is brought to bear on the tooth 18, same yields to the rear, tensioning the spring 34, which causes said tooth to resume upright position when the pressure thereon is released. In this way the arms are readjusted for operation. The tooth 18 yielding to the rear allows the arms to pass within the escapement. After the arms have passed the tooth 18 resumes its upright position, and thus prevents the said arms from turning to the left until released as described above. The tooth 19 is stationary.

To provide a means for strengthening and weakening the tension of the springs 7, the axle 6 has fastened to it the ratchet-wheel 35, and a pawl 36, engaging the teeth of said ratchet-wheel, is pivoted on the outer upper side of the case 37. Said pawl is held against the ratchet-wheel 35 by the spring 38 to strengthen the tension of the springs 7. The cap 39 is turned to the right. It being fastened to the upper end of the axle 6 revolves said axle, and the arms 3, being held in check by the escapement 14, prevent the cups to revolve, to whose inner sides one end of the said springs are fastened, while the axle 6, to which the other ends are fastened, winds them up. The pawl 36 holds the axle 6 against the tension of said springs to weaken the tension of said springs. The pawl 36 is disengaged from the said ratchet-wheel 35, which allows the axle to revolve to the left, thus unwinding the said springs.

The arrangement of the parts of the desk portion B, 40, 41, 42, 43, 44, 45, and 46, are taken from the music-stand of L. P. Halladay, No. 730,015, June 2, 1903. The parts 47 48 are taken from the music-stand of Albert Krauth, No. 687,244, November 26, 1901. The parts 49 49ª 49ᵇ 50 51, the central bar 2, the vise 52, the finger-lever 20, and the rod 25 we have invented to be used in combination with the above-named parts.

40 40 are two parts of a shelf-like lower ledge that are pivoted at their inner ends to the part 49, which is riveted to the central bar 2. Said bar 2 has also riveted to it the part 49ª and the part 49ᵇ. To these parts are pivoted the links 42 42 and the jointed extension-bars 44 44. To the two parts 40 40 are pivoted the two links 41 41. Said links are all pivoted at 43 43, as indicated. The two jointed extension-bars 44 44 are each composed of two parts and are pivoted at 45 45 to the part 49$^b$. The two parts of the said jointed extension-bars are pivotally joined at 46 46, and the parts 40, 41, 42, and 44 fold together in a known manner. The links 41 41 have pivoted to their upper ends the parts 51 51, which serve as extensions to said links. The wires 50 50 serve to fill out the space between the parts 40 41 42 and the central bar 2. The music-leaf-turning mechanism A is pivotally secured at 1 to the upper end of the central bar 2, and in folding the desk portion B the mechanism A is turned on said pivot 1, so that the arms 3 become parallel to said central bar 2. The indentation 53, Fig. 6, on the extension 55 of the lower case 37 fits into another indentation 54 on the central bar 2 directly beneath same and serves to hold the music-leaf-turning mechanism A in upright position when in operation. The vise 52 is secured to the central bar 2 and consists of two jaws 56 and 56$^a$, which are separated and closed by means of a thumb-screw 57, on one-half of whose shaft the threading runs from the right to the left and on the other half from the left to the right. Said thumb-screw is pivoted at 99 and at 99$^a$. This arrangement causes the jaws 56 and 56$^a$ to separate when the thumb-screw 57 is turned in one direction and to close when turned in the opposite direction. This vise serves to hold the leaves of music together as in a bound book, keeps them in the center of the desk portion B, keeps the leaves of music within the reach of the clasps 4, and when the music-leaf-turning stand is used in the open air secures the leaves of music from being blown away by the wind. The jaw 56 is provided with an indentation 56$^b$ and the jaw 56$^a$ with a projection 56$^c$, which fits into the indentation 56$^b$. Said jaws are also roughened on their inner surfaces by cross-lines. Said indentation, projection, and cross-lines cause the leaves of music to be more firmly held. To the rear face of the central bar 2 is pivotally secured the upper end of the leg 48. The lower end of said leg is adapted to be inserted in the tube 58 of the tripod portion C. Said leg is of length to serve as a brace for the music-leaf-turning stand when used without its tripod portion C, as on a table or any other ordinary surface. A slotted brace 47 is pivoted to the rear face of the central bar 2 below the pivot of the leg 48, having a series of teeth in the upper wall of the slot adapted to be selectively engaged by a pin 59 projecting from the side of the leg 48.

When the desk portion B and the music-leaf-turning mechanism A are used without the tripod portion C, the leg 48 is adjusted upon its pivot to give the desired inclination to the desk portion B, and is thus held by the brace 47. When the desk portion B is to be folded, then the brace 47 and the leg 48 fold down against the rear face of the central bar 2, the downward-folding motion of the leg 48 causing the simultaneous downward-folding motion of the slotted brace 47. When the desk portion B is to be used in conjunction with the tripod portion C, the leg 48 is set within the tube 58 of the tripod portion C, and the brace 47 again serves to provide for and securing the angular adjustment of the desk portion B. The arms 3 have each pivoted to them a small plate 60, which serves to mark the arms that are to be readjusted when a piece of music secured thereto is to be repeated. This plate 60 when not in use is in a parallel position to the arms 3, and when a piece of music is to be repeated the arm upon which it is secured is marked, so as to be easily distinguishable from the rest of the arms by turning the plate 60, secured to said arm, in vertical position, so that it projects above the arm. To prevent the arms 3 from clashing together, they are provided with rubber collars or buffers 61. These coming in contact with each other keep the arms 3 apart. Said arms are flat strips of metal.

The tripod portion C is of the same construction as the standard of Albert Krauth's music-stand, No. 687,244, November 26, 1901, and it is deemed unnecessary to give a description of it here, as it can be had by consulting the specification and drawings of its inventor, above cited.

A cushion 62, of rubber, felt, or any other suitable material, is to prevent the music-leaf-turning stand when used on pianos and organs from injuring the surface with which it comes in contact. The placement, arrangement, and number of same can be varied.

The bellows D is of ordinary construction, comprising an upper and lower plate—63 the upper and 64 the lower—that are hinged together at 65. A leather portion 66, arranged in folds, is fastened to said plates 63 and 64, so that the space between them is air-tight with the exception of the two inlets 67 and the flexible tube E. Said inlets have flaps 68 on their inner sides, which opens downward by the air-pressure from without when the plate 63 after having been depressed by the player's foot again regains its normal position. Said plate regaining its normal position is caused by means of a spring 69, which is tensioned whenever said upper plate is depressed. The downward opening of said flaps allows air to pass within the bellows to replenish the exhausted supply of air. The air-pressure within, caused by the downward movement of the plate 63, closes the flaps 68, so that the air is forced up through the flexible tube E, fastened to the bellows. It is obvious that the shape and proportions of said bellows can be varied. The elements of the music-leaf-turning mechanism A are mounted partially inside and partially outside of a metal casing 37. The cap 39 serves to protect the cups 5 from the dust and other substances.

The equivalent music-leaf-turning mechanism, Figs. 7 and 8, is essentially the same as the music-leaf-turning mechanism shown in Figs. 5 and 6, with the exception that more arms and the equivalent escapement 70, Fig. 13, are employed on said equivalent mechanism. The escapement 70 is a shaft 71, having a series of teeth 72 projecting therefrom and situated in back of each other, so arranged that when the shaft 71 is revolved to the right it removes the first tooth from in front of the first arm. The same revolving movement causes the tooth immediately behind the first tooth to come in front of the second arm, thus holding it. Another partial revolution in the same direction removes the second tooth from in front of the second arm, releasing same, and the tooth immediately behind the second tooth comes in front of the third arm, these partial revolutions being continued until the last tooth releases the last arm. The movement which removes the last tooth from in front of the last arm does not replace it by another tooth. Another partial revolution of said shaft again brings the first tooth in the path of the arms 3. The escapement has now made a complete revolution. Said teeth 72 are all of hinge construction, consisting of two parts 73 and 73$^a$, which are pivotally connected by a pin 100. A spring 101, one end of which is secured to the part 73 and the other end to the part 73$^a$, normally holds said part 73 extended. Said teeth yield to the rear for the same purpose as the tooth 18 of the escapement 14.

When a large number of arms are employed in the music-leaf-turning mechanism, the construction of the escapement 70 serves to keep the arms in their respective positions on the right side of the desk portion B until released, each arm having a tooth to release it. When the escapement 14 is used, the arms following the first arm all move up to the tooth 18 whenever a preceding arm is released. The escapement 14 can only be used for a limited number of arms, as will be shown by a dotted line 74, Fig. 7, which illustrates the position the last arm would have before releasing it. If the escapement 14 were used instead of the equivalent escapement 70, Fig. 13, the acute angle in which it would hold the leaf of music attached thereto would make it difficult for the player to read. It will be seen that the equivalent escapement, Fig. 13, is the most important feature of our invention when a large number of arms are employed in the construction thereof. Both ends of the shaft 71 are provided with ratchet-wheels 75 and 75$^a$, which are secured thereto. The one end of the spring-retracted levers 76 and 76$^a$ are pivotally secured to the said shaft, and to these levers are pivoted the pawls 77 and 77$^a$, which engage the teeth of the said ratchet-wheels. Said pawls are yieldingly held against said ratchet-wheels by the springs 78$^b$ and 78$^c$. The other end of the lever 76 is engaged by the rod 25. The other end of the lever 76$^a$ is engaged by the cap 22. When the lever 76 is raised by the agency of the finger-lever 20 or the lever 76$^a$ is raised by the pneumatic releasing device D E 21 22, the escapement 70 partially revolves. This partial revolution is caused by the pawls 77 and 77$^a$ engaging the teeth of said ratchet-wheels, and when the pressure is released on the above-named releasing devices the levers 76 and 76$^a$ fall back in their normal positions, the lever 76 by means of the tension of the spring 78 and the lever 76$^a$ by reason of the spring 78$^a$ thus causing the pawls 77 and 77$^a$ to slide back to the following tooth of their ratchet-wheels. When an arm is released by means of the finger-lever 20, the pneumatic releasing device D E 21 22 remains inactive, and the pawl 77$^a$ serves to prevent the escapement from turning back in the wrong direction. When the pneumatic releasing device D E 21 22 is used, the pawl 77 then serves this purpose, the lever 76 remaining inactive.

An equivalent to the music-leaf-turning mechanism, Figs. 7 and 8, is the music-leaf-turning mechanism, Figs. 9 and 10. The elements of said mechanisms are of the same construction, the difference being in the arrangement of said elements, the escapement being placed below the arms 3 in Figs. 7 and 8 and above in Figs. 9 and 10, the cap 22 and the tube 21 being also above the arms, as is shown by Figs. 9 and 10.

An equivalent to the desk portion B is partly shown by Figs. 18 and 19, in which 79 is the lower shelf-like ledge, which is pivoted to the part 80. Said part 80 and the parts 80$^a$ and 80$^b$ are riveted to the central bar 81. To the part 80$^a$ is pivoted the jointed link 82, and to the part 80$^b$ is pivoted the slotted link 83. The stud 84, which is the point of connection between the two parts of the jointed link 82, travels in the slot 83$^a$ of the link 83. At the outer end of the ledge 79 is pivoted the link 85. The stud 86 travels in the slot 87. The upper end of the link 85 and the outer end of the jointed link 82 are pivotally connected at 88. The operation of said parts in folding is sufficiently shown by Fig. 19, which is partly folded.

Another equivalent to the desk portion B is partly shown by Figs. 20 and 21, in which the central bar 89 has riveted to it the parts 90 and 90$^a$. To the part 90 is pivoted the lower shelf-like ledge 91. To the part 90$^a$ is pivoted the jointed link 92. Its two parts are pivotally connected at 93. The outer end of the ledge 91 has pivoted to it the link 94. The stud 95 travels in the slot 96 of the ledge 91. The upper end of the link 94, the outer end of the jointed link 92, and the upper end of a diagonal link 97 are all pivotally connected at 98. The lower end of the diagonal link 97 is pivotally secured to the part 90 with the ledge 91. The operation of these parts in folding is shown by Fig. 21, it being partly folded.

What we claim, and desire to secure by Letters Patent of the United States, is—

1. The combination with a folding music-stand having a middle bar, of a leaf-turning mechanism pivotally mounted on the top of the said bar and including an escapement, said mechanism and escapement being foldable with the stand, a finger-lever pivoted at the lower end of the bar, and a connection between said finger-lever and the escapement.

2. The combination with a folding music-stand having a middle bar, of a leaf-turning mechanism pivotally mounted on the top of said bar and including an escapement, said mechanism and escapement being foldable with the stand, and a portable bellows and flexible tube operatively connected to the escapement.

In testimony whereof we have signed our names to this specification, in the presence of two subscribing witnesses, this 21st day of March, 1905.

JOSEPH BAHL.
JOSEPH CHRISTIAN BAHL.

Witnesses:
AUG. M. PETERSEN,
EUGENE BURNITZ.